United States Patent [19]

Jubb

[11] Patent Number: 5,076,055

[45] Date of Patent: Dec. 31, 1991

[54] RECIRCULATORY SYSTEM

[75] Inventor: Albert Jubb, Kenilworth, United Kingdom

[73] Assignee: C.D.S.S. Limited, Northamptonshire, United Kingdom

[21] Appl. No.: 576,475

[22] Filed: Oct. 1, 1990

[30] Foreign Application Priority Data

Feb. 2, 1989 [GB] United Kingdom ............... 8902259
Feb. 2, 1989 [GB] United Kingdom ............... 8904349

[51] Int. Cl.$^5$ ........................................ F02M 25/07
[52] U.S. Cl. ................................. 60/279; 123/569
[58] Field of Search ......................... 60/279; 123/569

[56] References Cited

U.S. PATENT DOCUMENTS

| | | | |
|---|---|---|---|
| 4,587,807 | 5/1986 | Suzuki ................................ | 60/274 |
| 4,674,463 | 6/1987 | Duckworth et al. ............... | 123/570 |
| 4,741,673 | 5/1988 | Jubb .................................. | 417/53 |
| 4,891,939 | 1/1991 | Brighenti .......................... | 60/278 |
| 4,899,544 | 2/1990 | Boyd ................................. | 60/618 |
| 5,016,599 | 5/1991 | Jubb .................................. | 123/570 |

Primary Examiner—Ira S. Lazarus
Assistant Examiner—Leonard Heyman
Attorney, Agent, or Firm—Webb Burden Ziesenheim & Webb

[57] ABSTRACT

A recirculatory system comprising a combustion chamber, means to cause fuel to combust in the combustion chamber, means to exhaust exhaust gas from the combustion chamber, a circuit through which the exhaust gas is fed from the combustion chamber and returned to the combustion chamber and the circuit including means to treat at least some of the exhaust gas to remove a part therefrom wherein storage means are provided to store the part removed from the exhaust gas in the circuit.

15 Claims, 1 Drawing Sheet

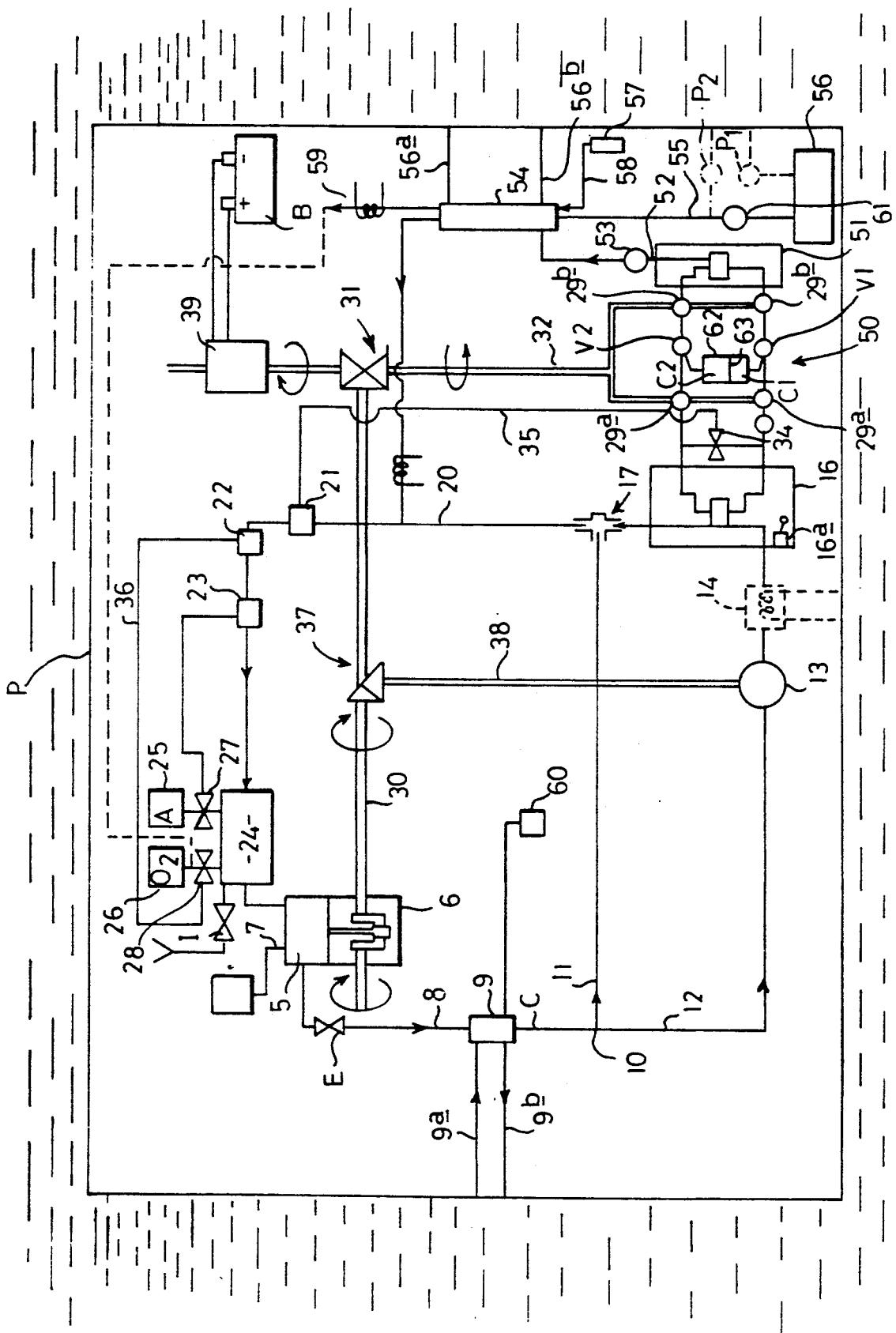

RECIRCULATORY SYSTEM

This invention relates to a recirculatory system, hereinafter referred to as being of the kind specified, comprising a combustion chamber, means to cause fuel to combust in the combustion chamber, means to exhaust exhaust gas from the combustion chamber, a circuit through which the exhaust gas is fed from the combustion chamber and returned to the combustion chamber and the circuit including means to treat at least some of the exhaust gas to remove a part therefrom.

The invention has been particularly, but not exclusively, developed for use with an internal combustion engine such as a compression ignition engine, spark ignition engine or gas turbine or an external combustion engine such as a Stirling engine. The invention is however also applicable to other combustion processes where it is desired to recirculate at least part of the exhaust gas back to a combustion chamber.

An object of the invention is to provide a new and improved recirculatory system of the kind specified.

According to one aspect of the present invention we provide a recirculatory system of the kind specified wherein storage means are provided to store the part removed from the exhaust gas in the circuit.

Liquifying means may be provided to liquify the part of the exhaust gas removed from the exhaust gas in the circuit.

Said part of the exhaust gas may be removed from the exhaust gas by treating the exhaust gas with a liquid to absorb a component, such as carbon dioxide, into the liquid.

The part absorbed in the liquid may be subsequently desorbed from the liquid at a position outside the circuit and within a pressure wall which encloses the system.

According to another aspect of the present invention we provide a recirculatory system of the kind specified wherein liquifying means are provided to liquify said part of the exhaust gas removed from the exhaust gas in the circuit.

Said part may be removed from the exhaust gas by treating the exhaust gas with a liquid to absorb a component, such as carbon dioxide, into the liquid.

The part absorbed in the liquid may be subsequently desorbed from the liquid at a position outside the circuit and within a pressure wall which encloses the system.

According to another aspect of the present invention we provide a recirculatory system of the kind specified wherein the means to treat at least some of the exhaust gas to remove part therefrom comprises means to treat the exhaust gas with a liquid to absorb a component, such as carbon dioxide, into the liquid and means to desorb the part absorbed in the liquid from the liquid at a position outside the circuit and within a pressure wall which encloses the system.

In the first aspect of the invention a container may be provided to store said part.

In the first and second aspects of the invention the liquifying means may comprise a compressor means to compress the gas.

In this case the gas may be carbon dioxide or other gas which may be liquified by compressing the gas at a working temperature, as hereindefined.

By working temperature we mean a temperature obtaining in a closed environment in which the recirculatory system is disposed. Typically the working temperature will lie in the range 1.5 C. to +32 C. particularly near the surface, and −1.5 C. to +10 C. at all depths.

Alternatively, the liquifying means may comprise cooling means to cool the gas.

In this case the gas may be water vapour or other gas which may be liquified by cooling to a temperature in said working range with or without pressure.

Further alternatively the liquifying means may comprise both cooling and compressor means. In this case the gas may be carbon dioxide which can be liquified at lower pressure if cooled to a lower temperature, such as a temperature below the working temperature.

Typically the part of the gas which is removed comprises carbon dioxide and water vapour, the carbon dioxide being liquified by virtue of being compressed, or compressed and cooled and being stored in liquid state under conditions of temperature and pressure to maintain the carbon dioxide liquid. Whilst the water vapour is liquified by virtue of being cooled and being stored in liquid state under conditions of temperature and pressure to maintain the water liquid.

The part may be removed from the exhaust gas by cooling the exhaust gas to liquify a component of the exhaust gas, such as water vapour, which is liquified by cooling at the pressure obtaining in the circuit.

In all the preceding aspects of the invention the part may be absorbed in the liquid at a first pressure and desorbed from the liquid at a second, lower, pressure.

Means may be provided to subject the liquid to a first pressure in a first region to permit said part to be absorbed therein and subsequently to subject the liquid to the second pressure at a second region outside the circuit to permit the part to be desorbed therefrom.

Said means may alternatively subject the liquid to said first and second pressures in a circulatory liquid loop.

Said means may comprise two chambers, the sizes of which can be simultaneously changed by a common member, means being provided alternately to connect the chambers each to one of said regions and to compensate for the resultant forces exercised on the member by the medium in said region with a counter-force of substantially the same size. Preferably the member changes the sizes of the chambers in the opposite sense and both chambers are simultaneously connected to the same region.

The member may be acted upon by an energy accumulator which exerts a force thereon which is substantially equal to the resultant force exerted thereon by the medium.

Said means may comprise means for isolating first and second variable volume chambers from one of said regions and placing said chambers in communication with the other of said regions, causing liquid from said other region to enter into the first variable volume chamber and displacing, from the second variable volume chamber into said other region, liquid which has previously entered the second chamber from said one region; isolating the chambers from said other region and placing the chambers in communication with said one region and displacing, from said first chamber into said one region, liquid which has previously entered said first chamber from said other region and causing liquid from said one region to enter into the second chamber.

Said means may comprise a vessel, a dividing member in the vessel, the vessel and the dividing member being relatively movable to divide the vessel into separate variable volume chambers, a first pair of valves, one of which controls passage of liquid between a first of said chambers and said one region, and the other which controls passage of liquid between a second of said chambers and said first region, a second pair of valves, one of which controls passage of liquid between said first chamber and said second region, the other of which controls passage of liquid between said second chamber and said second region, operating means repeatedly to perform the following cycle of operations; close the valves of one of said pairs and open the valves of the other of said pairs, then move the dividing member to cause the volume of said first chamber to increase and the volume of said second chamber to decrease, then close the valves of the other of said pairs and open the valves of said one pair, and then move the dividing member to cause the volume of said first chamber to decrease and the volume of said second chamber to increase.

The means may comprise an apparatus as described and claimed in our U.S. Pat. No. 4,741,673, the content of which is incorporated herein by reference.

An embodiment of the invention will now be described by example with reference to the accompanying drawing, which is a diagrammatic illustration of a recirculatory system embodying the present invention.

In this embodiment an internal combustion engine is arranged to operate both under conditions of normal aspiration from the atmosphere and in environments where communication with free atmosphere is undesirable or impossible, such as under water and particularly at relatively great depth and it is in this latter context that the engine will hereinafter be described.

The engine comprises a four cylinder reciprocating unit 6 designed to operate on a diesel cycle and hence has four combustion chambers, one of which is shown at 5 and an inlet valve or valves through which a mixture of gases containing oxygen or other combustion supporting gas are admitted to the combustion chamber and an exhaust valve or valves through which exhaust gas is ducted from the chambers. The engine also comprises a means 7 to inject fuel into the combustion chambers and a circuit 3 through which the exhaust gas is exhausted from and returned to the combustion chambers.

The circuit C comprises a first part 8 which extends to a water cooler 9 in which the exhaust gas is cooled by sea water drawn from and returned to the exterior of a pressure wall P, within which the system is disposed, by conduits 9a, 9b.

Downstream of the water cooler 9 there is a junction 10 from which a bypass part 11 extends. Downstream of the junction 10 there is a part 12 of the circuit C which extends via a compressor 13 and a further optional water cooling unit 14 to an absorber unit 16.

Downstream of the absorber unit 16 the part 12 of the circuit C continues to an injector 17 by which gas leaving the absorber unit 16 is injected into the bypass branch 11.

Alternatively, the gas leaving absorber 16 could be taken back to remove heat from incoming compressed gas from compressor 13 via a gas/gas heat exchanger so that the heat to be further removed in cooler 14 can be reduced, keeping absorber 16 and desorber 51 cool, (so $CO_2$ dissolves etc. more easily) while the gas to injector 17 is heated, increasing its effectiveness in adding pressure rise in the bypass flow. If the compression ratio of the compressor is about 3 or more this is a particularly valuable economy.

Downstream of the injector 17 the circuit comprises a circuit part 20 which feeds gas back to the combustion chamber 5 via sensor units 21, 22, 23 and a manifold 24, but not necessarily in this order. A reservoir 25 of monatomic gas such as helium or argon and a reservoir 26 of oxygen are provided and are arranged to feed monatomic gas and oxygen respectively to the manifold 24 through control valves 27, 28 respectively.

The absorber 16 is provided with a means to expose water or other suitable liquid within the absorber 16 to the exhaust gas circulated therethrough by the part 12 of the circuit C so that carbon dioxide in the exhaust gas is absorbed in the water. Water is circulated through the absorber 16 via pumps 29a driven by an engine drive shaft 30 via a gear box 31 and shaft 32. In order to control the amount of water circulated through the absorber 16 by the pump 29a a motorised bypass valve 34 is provided, which is adjusted in accordance with a signal provided along a line 35 from the sensor 21 which senses the total gas pressure in the circuit C downstream of the absorber 16.

The water is circulated by the pump 29a to a water management system 50 which transfers the water between a region of high pressure obtained in the absorber 16 and a region of lower pressure obtained in a desorber 51 and through which the water is circulated by further pumps 29b driven from the shaft 32.

In the desorber 51 carbon dioxide which was absorbed in the water by the absorber 16 is desorbed therefrom and is fed by a conduit 52 to a compressor means 53 which preferably comprises a multi-stage compressor with inter-cooling so that the carbon dioxide is compressed to relatively high pressure without excessive temperature rise. The heat removed from the compressed gas after the various stages of compression by the inter -, and after -, coolers, is passed to water from outside the pressure wall P and rejected overboard via a heat exchanger 54. The pressurised carbon dioxide is then fed to the heat exchanger 54 where it is cooled to a temperature such that the carbon dioxide is liquified and the liquid carbon dioxide is fed by a conduit 55 to a storage tank 56 where it is stored in liquid state under appropriate conditions of temperature and pressure.

The heat exchanger 54 has sea water circulated therethrough from the exterior of the pressure wall P through conduits 56a, 56b to effect an initial stage of cooling and in addition liquid oxygen from a reservoir 57 is fed thereto via conduit 58 and the liquid oxygen is allowed to gasify in heat exchange relationship with the carbon oxygen to further cool the carbon dioxide in the heat exchanger 54. The gaseous oxygen can then be further heated by an appropriate heater 59 and may then be fed to the valve 28 in addition to, or instead of, the oxygen supplied from the reservoir 26.

In the operation of the engine in a non-atmospheric closed cycle, oxygen from the valve 28 is delivered to the manifold 24 at the operating pressure of the engine and is ducted into the engine cylinders together with the returned exhaust gas. The gas charge is compressed within the engine cylinders, causing the temperature of the gas to increase, and fuel is injected, producing combustion of the fuel in conventional manner. The resulting exhaust gas which will contain carbon dioxide, water vapour, inert gas and minor amounts of other constituents is conducted from the combustion chamber 5 through the first part 8 of the circuit C and a first proportion of the exhaust gas passes via the part 12 of the circuit C, whilst a second proportion passes along the bypass part 11 of the circuit C. The proportions of the exhaust gas passing through the bypass branch and the main branch may vary. In the present example two thirds of the exhaust gas passes through the bypass part 11, and at lower power, a larger fraction.

The gas in the bypass part 11 and part 12 is cooled by the cooler 9 to a temperature approaching that of the temperature of the water externally to the pressure wall P. The exhaust gas in the part 12, is compressed by the compressor 13, which may be of any suitable type, and the exhaust gas may be compressed to a pressure of, for example, six atmospheres. If desired, however, pressure may lie in the range two six atmospheres or maybe higher. If desired, after compression the exhaust gas may be cooled by a counter flowed gas/gas heat exchanger transferring heat to the outlet gas from absorber 16 to injector 17, and/or by a further water cooler 14 and is then fed into the absorber 16 in which the exhaust gas is treated with sea water at the compressed pressure, for example, a pressure of about six atmospheres, to remove carbon dioxide. The absorber may be of any suitable type, preferably comprising a rotor provided with wire mesh or other material, having a high surface area to volume ratio, through which the water is thrown radially outwardly by centrifugal force, whilst the exhaust gas is caused to pass therethrough in counterflow. This absorber achieves rapid absorption of carbon dioxide into the sea water and is compact. The absorber unit 16 is provided with a level control 16a to ensure that the absorber is not flooded or run below a predetermined water level.

The thus treated exhaust gas then passes to the injector 17 where it is injected into the bypass part 11, in which the exhaust gas has not been treated with carbon dioxide. The recombined portions of exhaust gas then pass via the part 20 of the conduit to the sensor unit 21. The sensor 21 measures the total pressure in the gas circuit C and provides a signal along the line 35 to the valve 34 so as to increase the water flow through the absorber 16 if the pressure exceeds the predetermined pressure and to reduce the water flow if the pressure falls below a predetermined pressure, so as to control the amount of carbon dioxide removed from the exhaust gas. The exhaust gas then passes to a sensor unit 22 which provides a control signal via the line 36 to the valve 28 which controls the amount of oxygen fed to the manifold 24 from the reservoir 26 to meter the correct amount of oxygen into the carrier gas. The sensor unit 22 comprises a conventional sensor for detecting oxygen content and may be provided with means to adjust the oxygen supply in accordance with operating parameters of the engine. Alternatively, the sensor 22 may be positioned to sense the oxygen content of the gases leaving the manifold 24 and to control the valve 28 to provide a desired oxygen content in the inducted gas.

The exhaust gas then passes to a further sensor unit 23 which is arranged to provide a control signal to the metering valve 27 which meters the amount of argon fed to the manifold 24 from the reservoir 25 to ensure that the proportion of helium or other monotomic gas in the inducted gas provides a desired ratio of specific heats gamma. In the present example the sensor 23 comprises a compressor having a pressure ratio at the rate of around 2:1 in which the exhaust gas is compressed followed by means to pass the compressed exhaust gas to a convergent/divergent passage, together with means to measure the inlet pressure and throat pressure in the passage. Changes of gamma changes the ratio of these two pressures (absolutely) and comparison means are provided to compare the two pressures and to produce an output in relation thereto which controls the valve 28. The change of ratio which occurs is very small and thus highly accurate transducers and comparative electrical circuits are provided. If desired any other means for assessing gamma may be provided.

Thereafter the exhaust gas is fed to the manifold 24 where helium or other monotomic gas and oxygen are added to the exhaust gas from the reservoirs 25, 26 via the valves 27, 28 in accordance with the sensor units as described hereinbefore.

Operation of the system may be started by pumping as much air from the system as practicable (and discharging the air externally of the pressure wall and then priming the system with a predetermined reserve of carbon dioxide and helium or other monatomic gas, (in ratio about 3 to 5), before turning the engine over and adding the needed oxygen, and then admitting fuel.

Once the system is primed and has been run steadily on fully closed cycle, the engine can be shut-down and started up again without change of gas content.

The engine as above described is designed to with a charge which simulates air, that is, with a mixture of charged gases having a gamma ratio of approximately 1.4 and the induction pressure is above atmospheric pressure by virtue of the increase in pressure caused by injection of the part of the exhaust gas which leaves the absorber. The water vapour generated combustion is, of course, condensed in the coolers and/or absorber and so is removed from the exhaust gas.

Oxygen is added to gas to maintain a suitable intake oxygen proportion, for example, 21%.

The proportion of the exhaust gas after condensation of the water vapour which passes through the bypass part 11 is approximately 65% to 75% of the total exhaust gas so that about 25% to 35% of the exhaust gas passes through the main branch and is compressed by the compressor 13 at low powers the fraction of exhaust flow through the compressor 13 can be lower if desired.

After absorption of carbon dioxide in the absorber 16 the gas is expanded, by any suitable means such as the hereinbefore described injector 17 or by a turbine so as to recover as much as possible of the energy previously used to compress the gases.

The diesel may be turbo charged, in which case the heat rejection and condensation of water in cooler 9 takes place between the turbine outlet and the compressor inlet.

The engine gas pressure level at the inlet can be about one atmosphere, or lower, or higher, according to the capacity of the engine.

The monotomic inert gas is best chosen as helium since losses of this gas in the system are very low and in principle only a small initial charge needs to be carried as a result the engine pumping losses can be reduced at high speeds due to the low molecular weight.

The liquid used in the absorber 16 has a fairly close approximation to being fully saturated with all the gases in the exhaust system and the liquid is chosen as having a notable preference for carbon dioxide in solution. One liquid which is reasonably suitable is fresh water where the carbon dioxide solubility at 20 C. is 90 cc, the oxygen solubility is 2.6 cc and the helium solubility 1.6 cc. Other liquids are possible, such as Amines.

The liquid in the absorber 16 is in a region of high pressure, in the present example six bars, and is transferred to a region of low pressure, in the present example approximately one bar, by the water management system 50 and the water is then counterflowed with the gas which emerges from solution at this reduced pressure, in the desorber 51 which is similar to the absorber 13 and is sufficiently efficient to largely desorb gases in the water down to near the one atmosphere approximate total pressure at which it is maintained by pumping out the gases, which now consist of at least 90% carbon dioxide.

The water, after desorbtion, is then transferred back to the high pressure region by the water management system 50 and is re-circulated through the absorber 16.

The desorbed gases are compressed by the compressor means 53 to a total pressure of the order of 20 to 100 bars. By using the cooling described hereinbefore arising from liquid oxygen, which produces a significant amount of cooling of the order of 20 C. to 40 C. below the cooling achievable by the use of sea water, the temperature of the compressed gases can be reduced to about minus 20 C. In this case the carbon dioxide starts to condense out at a partial pressure of 20 atmospheres of carbon dioxide, that is at about 22 atmospheres of total pressure. If the compression is carried out further, a larger proportion of the carbon dioxide will condense out as liquid, whilst in the other gases the partial pressure is increased due to accumulation. If a total pressure of 40 bars is achieved all the other gases are concentrated and can be returned to the gas circuit and therefore conserved and a small fraction of the power required for compression may be recoverable from this.

If no cooling is available or convenient compression to a total pressure of 100 to 120 bars approximately is necessary to liquify the carbon dioxide at a working temperature of about 20 C.

The liquid carbon dioxide is then pumped by a pump 61 to the tank 56 where it is stored at an appropriate temperature and pressure. For example, 50 bars pressure at minus 20 C. or 120 bars pressure at plus 20 C. Since the specific gravity of liquid carbon dioxide is approximately one, the stored volume is not large— about three times the volume of the fuel burnt.

If oxygen is provided as compressed gas, then it is possible to provide a sequence of oxygen containers and to evacuate a sequence of oxygen containers down to lower pressure, for example, three bars and then down to one bar or less using the first stage of the carbon dioxide compressor train 53 to remove as much as possible and then liquid carbon dioxide can be stored in a sequence of emptied oxygen bottles which may be positioned outside the pressure wall P.

The water management system is as described in our British Patent No. 2,158,889 and comprises a vessel 62 having a dividing member 63 such as a piston, diaphragm or the like which is movable relative to the vessel to divide the vessel into first and second separate variable volume chambers C1, C2. First and second pairs of valves V1, V2 control passage of liquid between the chambers and regions and operating means, not shown, are provided to move the valves to perform a following cycle of operations.

The valves of one of said pairs are closed to connect the high pressure region of the absorber 16 through the valves to the chambers C1 and C2, whilst the valves of the other of said pairs are closed to isolate the low pressure region of the desorber 51 from the chambers C1, C2. Movement is then caused of the dividing member 63 to change the volume of the chambers. For example, in FIG. 1, the member 63 is moved upwardly to increase the volume of the chamber C1 and decrease the volume of the chamber C2 so that liquid enters the chamber C1 from the absorber 16 and liquid leaves the chamber C2 and enters the absorber 16. The valves of the one pair of said valves is then closed so that the chambers C1, C2 are isolated from the high pressure region of the absorber 16. A small outleak of water is caused to occur through a pressure release valve, to lower the pressure to that of the low pressure region and then the valves of said other pair are opened to connect the chambers C1 and C2 to the low pressure region of the desorber 51. A second movement of the dividing member then occurs, for example, downwardly in the example illustrated in FIG. 1 to force liquid from the chamber C1 to the low pressure region 51 whilst liquid from the low pressure region of the desorber 51 enters the chamber C2.

The valves V1, V2 are then operated to isolate the chambers from both regions, the pressure release valves are operated to permit a small inleak of fluid to raise the pressure to that of the high pressure region and the valves are operated to connect the chambers C1 and C2 to the high pressure region.

This cycle of operations is repeated so that the water is transferred from the region of high pressure of the absorber 16 to the region of low pressure of the desorber 51 and then returned.

The dividing member 63 may be caused to move by any desired means such as a suitable drive means acting directly on the member 63 or by virtue of pressure of water entering the chambers C1 and C2 imposed by the pumps 29a, 29b. Movement of the dividing member 63 may be supplemented by spring or other biasing means and the water management system 50 may comprise more than one vessel and any of the various details described in our U.S. Pat. No. 2,158,889 or from our co-pending application filed concurrently herewith entitled "Apparatus for and method of managing liquid under pressure" our file H5547WO, the contents of both of which are incorporated herein by reference, may be utilised.

In the present example a single vessel 62 is provided but if desired more than one vessel 62 may be provided. In such a case, the vessels may be arranged so that some accept liquid from and deliver liquid to the absorber 16 whilst others accept liquid from and deliver liquid to the desorber 51. If desired, however, such multiple vessels may be operated in any desired phase relationship and, indeed, one or some vessels may be inoperative whilst another or others may be operative so long as over a suitable period, depending on the capacity of the system, the liquid transfers are equal on average.

In the above example the part of the exhaust gas which is removed and liquified is stored to provide a fully closed system. Once the part is liquified the power required to pump the liquified part overboard, i.e. outside of the pressure wall at all external pressures less than about 1,000 atmospheres is not critical and therefore aspects of the invention encompass a system as described hereinbefore except that provision is made for pumping the carbon dioxide, or other liquified part, out of the pressure wall and such pumping means may be provided in addition to the storage means described hereinbefore or in place thereof. Such alternative pumping arrangements are indicated diagrammatically at P1 and P2 in dotted and chain dotted lines respectively.

Such a pump out ability may be utilised to manipulate the buoyancy of a vessel containing the recirculatory system. For example, liquid carbon dioxide which has been stored could be pumped out to gain buoyancy. Alternatively, if the liquid carbon dioxide is not stored but is pumped out continuously, then some water may be admitted into the vessel to control buoyancy to compensate for the pumped out liquid gas.

The features disclosed in the foregoing description, or the accompanying drawings, expressed in their specific forms or in terms of a means for performing the disclosed function, or a method or process for attaining the disclosed result, or a class or group of substances or compositions, as appropriate, may, separately or any combination of such features, be utilised for realising the invention in diverse forms thereof.

What is claimed is:

1. A recirculatory system comprising a combustion chamber, means to cause fuel to combust in the combustion chamber, means to exhaust exhaust gas from the combustion chamber, a circuit through which the exhaust gas is fed from the combustion chamber and some of the exhaust gas is returned to the combustion chamber and the circuit including means to treat at least some of the exhaust gas to remove a part therefrom, wherein the means to treat at least some of the exhaust gas to remove part therefrom comprises means to treat the exhaust gas with a liquid to absorb said part into the liquid and means to desorb the part absorbed in the liquid from the liquid at a position outside the circuit and within a pressure wall which encloses the system.

2. A system according to claim 1 wherein liquifying means are provided to liquify at least a portion of said part of the exhaust gas removed from the exhaust gas in the circuit.

3. A system according to claim 2 wherein the liquifying means comprises a compressor means to compress the gas.

4. A system according to claim 2 wherein the liquifying means comprises cooling means to cool the gas.

5. A system according to claim 2 wherein the liquifying means comprises both cooling and compressor means.

6. A system according to claim 1 wherein a container is provided to store said part.

7. A system according to claim 1 wherein the part is absorbed in the liquid at a first pressure and desorbed from the liquid at a second, lower, pressure.

8. A system according to claim 7 wherein means are provided to subject the liquid to a first pressure in a first region to permit said part to be absorbed therein and subsequently to subject the liquid to the second pressure at a second region outside the circuit to permit the part to be desorbed therefrom.

9. A system according to claim 8 wherein said means alternatively subjects the liquid to said first and second pressures in a circulatory liquid loop.

10. A system according to claim 8 wherein said means comprises two chambers, the sizes of which can be simultaneously changed by a common member, means being provided alternately to connect the chambers each to one of said regions and to compensate for the resultant forces exercised on the member by the medium in said region with a counter-force of substantially the same size.

11. A system according to claim 10 wherein the member changes the sizes of the chambers in the opposite sense and both chambers are simultaneously connected to the same region.

12. A system according to claim 10 wherein the member is acted upon by an energy accumulator which exerts a force thereon which is substantially equal to the resultant force exerted thereon by the medium.

13. A system according to claim 8 wherein said means comprises means for isolating first and second variable volume chambers from one of said regions and placing said chambers in communication with the other of said regions, causing liquid from said other region to enter into the first variable volume chamber and displacing, from the second variable volume chamber into said other region, liquid which has previously entered the second chamber from said one region; isolating the chambers from said other region and placing the chambers in communication with said one region and displacing, from said first chamber into said one region, liquid which has previously entered said first chamber from said other region and causing liquid from said one region to enter into the second chamber.

14. A system according to claim 8 wherein said means comprises a vessel, a dividing member in the vessel, the vessel and the dividing member being relatively movable to divide the vessel into separate variable volume chambers, a first pair of valves, one of which controls passage of liquid between a first of said chambers and said one region, and the other which controls passage of liquid between a second of said chambers and said first region, a second pair of valves, one of which controls passage of liquid between said first chamber and said second region, the other of which controls passage of liquid between said second chamber and said second region, operating means repeatedly to perform the following cycle of operations; close the valves of one of said pairs and open the valves of the other of said pairs, then move the dividing member to cause the volume of said first chamber to increase and the volume of said second chamber to decrease, then close the valves of the other of said pairs and open the valves of said one pair, and then move the dividing member to cause the volume of said first chamber to decrease and the volume of said second chamber to increase.

15. A system according to claim 1 wherein said part comprises carbon dioxide.

* * * * *

UNITED STATES PATENT AND TRADEMARK OFFICE
CERTIFICATE OF CORRECTION

PATENT NO. : 5,076,055                 Page 1 of 2

DATED : December 31, 1991

INVENTOR(S) : Albert Jubb

It is certified that error appears in the above-identified patent and that said Letters Patent is hereby corrected as shown below:

Title page, under Foreign Application Priority Data, item [30] "Feb. 2, 1989 [GB] United Kingdom 8904349" should read --Feb. 25, 1989 [GB] United Kingdom 8904349--.

Column 3 Line 44 "3" should read --C--.

Column 5 Line 16 after "two" insert --through--.

Column 5 Line 64 "monotomic" should read --monatomic--.

Column 6 Line 13 "monotomic" should read --monatomic--.

Column 6 Line 28 after "to" insert --run--.

Column 6 Line 58 "monotomic" should read --monatomic--.

Column 6 Lines 60-61 "carried as" should read --carried. As--.

Column 7 Line 15 "desorbtion" should read --desorption--.

UNITED STATES PATENT AND TRADEMARK OFFICE
CERTIFICATE OF CORRECTION

PATENT NO. : 5,076,055             Page 2 of 2

DATED : December 31, 1991

INVENTOR(S) : Albert Jubb

It is certified that error appears in the above-identified patent and that said Letters Patent is hereby corrected as shown below:

Column 7 Line 57 "British Patent No. 2,158,889" should read --U.S. Patent No. 4,741,673--.

Column 8 Line 41 "2,158,889" should read --4,741,673--.

Column 8 Line 44 delete "our file H5547WO".

Signed and Sealed this

Fourth Day of May, 1993

*Attest:*

MICHAEL K. KIRK

*Attesting Officer*      *Acting Commissioner of Patents and Trademarks*